United States Patent [19]

Pappalardo et al.

[11] Patent Number: 4,772,417
[45] Date of Patent: Sep. 20, 1988

[54] PROCESS FOR PREPARING HIGH-BRIGHTNESS YELLOW-EMITTING TRIBOLUMINESCENT PHOSPHORS

[75] Inventors: Romano G. Pappalardo, Sudbury; Thomas E. Peters, Chelmsford, both of Mass.

[73] Assignee: GTE Laboratories Incorporated, Waltham, Mass.

[21] Appl. No.: 684,680

[22] Filed: Dec. 21, 1984

[51] Int. Cl.$^4$ ............................................. C09K 11/71
[52] U.S. Cl. ...................... 252/301.4 P; 252/301.4 F; 252/301.6 F; 252/301.6 P
[58] Field of Search ............. 252/301.4 PE, 301.6 PE; 313/486

[56] References Cited

U.S. PATENT DOCUMENTS 2,826,553  3/1958  Butler ........................... 252/301.4 P
3,013,979  12/1961  Rauby .
4,306,173  12/1981  Pappalardo .
4,446,049  5/1984  Pappalardo .

FOREIGN PATENT DOCUMENTS 582122  4/1941  United Kingdom .
578272  6/1942  United Kingdom .

OTHER PUBLICATIONS

Botden "Philips. Res. Rep." 7, 1952, pp. 215–217.
Ivey, J. Opt. Soc. Amer., 53:1175 (1963).
Walters, Appl. Optics, vol. 10, No. 5 (1971).
Ranby, Brit. J. Appl. Phys., 5 (Suppl. 4): 18 (1955).

*Primary Examiner*—Jack Cooper
*Attorney, Agent, or Firm*—Ernest V. Linek

[57] ABSTRACT

The present invention is directed to luminescent materials having the general formula:

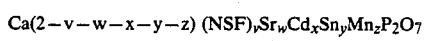

$$Ca_{(2-v-w-x-y-z)}(NSF)_v Sr_w Cd_x Sn_y Mn_z P_2 O_7$$

wherein:
NSF is the non-stoicheometric factor;
$0 \leq v \leq 0.01$
$0 \leq w \leq 0.08$;
$0 \leq x \leq 0.05$;
$0.01 \leq y \leq 0.03$; and
$0.05 \leq z \leq 0.15$.

1 Claim, 2 Drawing Sheets

PROCESS FOR PREPARING HIGH-BRIGHTNESS YELLOW-EMITTING TRIBOLUMINESCENT PHOSPHORS

BACKGROUND OF THE INVENTION

The present invention is directed to luminescent materials, to methods of making such materials, and to methods of using such materials. More particularly, the present invention is directed to high brightness, yellow emitting triboluminescent phosphors, especially useful in low-pressure fluorescent lamps intended for general lighting purposes.

Yellow-emitting phosphors that are efficiently excited by 254 nm radiation are presently required as the dominant component in two-phosphor blends, for high-brightness, low-pressure fluorescent lamps see, H. F. Ivey, *J. Opt. Soc. Amer.*, 53: 1175(1963) and W. Walters, *Appl. Optics*, 10. The material that is currently employed in the commercial products of this type of high brightness lamp is calcium fluoroapatite coactivated with Sb and Mn. One such commercial phosphor, GTE Sylvania Type 4381, available from the Chemical and Metallurgical Division, GTE Precision Materials Group, Towanda, PA 18848, was used as the reference material herein.

In the calcium fluoroapatite matrix, abbreviated herein CaFAP, the Mn emission occurs in the yellow spectral region, and peaks at about 575 nm. In view of the well known inability of $Mn^{2+}$ to efficiently absorb 254 nm radiation in most host lattices, one must discover a suitable sensitizer, that can be relied upon to absorb the exciting radiation and then to transfer it to $Mn^{2+}$. In the Type 4381 phosphor, the role of sensitizer is performed by $Sb^{3+}$. Since, in turn, $Sb^{3+}$ has a fairly broad emission with peak at 500 nm in the CaFAP matrix, and since the sensitization process does not completely quench the intrinsic emission of $Sb^{3+}$, the phosphor in question does not exhibit a yellow emission, but a whitish emission, due to the combination of the emission bands from activator and sensitizer. See for example, H. F. Ivey, *J. Opt. Soc. Amer.*, supra and W. Walters, *Appl. Optics*, supra.

In the two-component blend scheme the highest brightness of the resulting white field is obtained by combining a narrow-band yellow emission with peak at 575 nm, and a narrow-band blue emission with peak at about 445 nm. It is evident that CaFAP:Sb:Mn does not strictly fulfill the requirements expected of the yellow-emitting component of the two-phosphor blend, because of the additional band peaking at about 500 nm and contributed by $Sb^{3+}$.

SUMMARY OF THE INVENTION

The present invention is directed to an efficient (for 254 nm excitation) yellow-emitting phosphor prepared by Sn-Mn coactivation of the β-phase of calcium pyrophosphate (herein after referred to as Ca-β-pyro). The phosphors of the present invention also exhibit very pronounced triboluminescence, or mechanoluminescence, that is, mechanical impact energy is efficiently converted by these phosphors into light.

The present invention is more particularly directed to efficient, high-brightness, yellow emitting phosphors comprising tin, manganese coactivated calcium pyrophosphate beta-phase matrices having the general formula:

$$Ca_{(2-v-w-x-y-z)}(NSF)_v Sr_w Cd_x Sn_y Mn_z P_2 O_7$$

wherein:
NSF is the non-stoichiometric factor;
$0 \leq v \leq 0.1$
$0 \leq w \leq 0.08$;
$0 \leq x \leq 0.05$;
$0.01 \leq y \leq 0.03$; and
$0.05 \leq z \leq 0.15$.

DETAILED DESCRIPTION OF THE PREFERRED EMBODIMENTS

Various pyrophosphates of alkaline-earth cations, i.e., $Me_2P_2O_7$ have been known for a long time as suitable hosts for phosphor materials, under either CRT or UV excitation. See for example, S. T. Henderson, *Proc. Roy. Soc. A*, 173: 323(1939); H. G. Jenkins et al., British Pat. No. 582,122 (1941); A. H. McKeag et al., British Pat. No. 578,272 (1942). In particular, sensitization of the Mn emission by $Sn^{2+}$ was reported by Ranby and coworkers, P. W. Ranby et al., *Brit. J. Appl. Phys.* 5 (Suppl. 4): 18(1955), for the case of pyrophosphate of Ca, Sr and mixed-cation analogs.

The principle of Sn-Mn sensitization in pyrophosphates is well established. An increase in phosphor efficiency by a factor of two or three over the value reported in the literature can occasionally be achieved by the use of different reagents and/or synthesis conditions. It is now been discovered that Ca-β-pyro materials coactivated with Sn and Mn can be prepared with emission brightness, for 254 nm excitation, comparable to that of the CaFAP:Sb;Mn material currently used in high-brightness, low-pressure fluorescent lamps.

Generally, such phosphors are prepared by firing a blend or a mixture of particulate starting materials, at a temperature and for a time, sufficient to yield the desired composition in the desired particle size range. Firing of a starting material blend or mixture is typically conducted at from about 900° C. to 1200° C. for from about 1 to 8 hours. Starting materials having the requisite final purity are preferred, e.g., reagent or luminescent grade.

The luminescent materials of the present invention have the following optimum, nominal formula $$Ca_{1.738}Sr_{0.05}Sn_{0.012}Mn_{0.14}P_2O_7$$

namely the total cation content is formulated at 1.94, instead of the stoichiometric value of 2. The intimately mixed powder reagents were heated up to 625° C. in a flow of 99.5% nitrogen/0.5% hydrogen (by volume) and maintained at that temperature in the mildly-reducing gas flow for 30 minutes. The hydrogen component in the gas flow was then eliminated, the reaction temperature was raised to 1200° C., and the reagents were fired at that temperature, still in the nitrogen atmosphere, for an hour. Further details of the starting reagents employed, of their processing and firing are given in the Examples.

The relative plaque brightness for 254 nm excitation was measured for both the materials under discussion, and the reference material (CaFAP:Sb:Mn, Sylvania Type 4381) by the following method. Under constant excitation and detection conditions the phosphor emission was filtered by a Kodak Wratten filter Model 106, and detected with an RCA photomultiplier model 1P21. For the material from Example 1 there was measured (for 254 nm excitation) a plaque brightness of 93%, relative to that of the reference phosphor.

Figure 1:
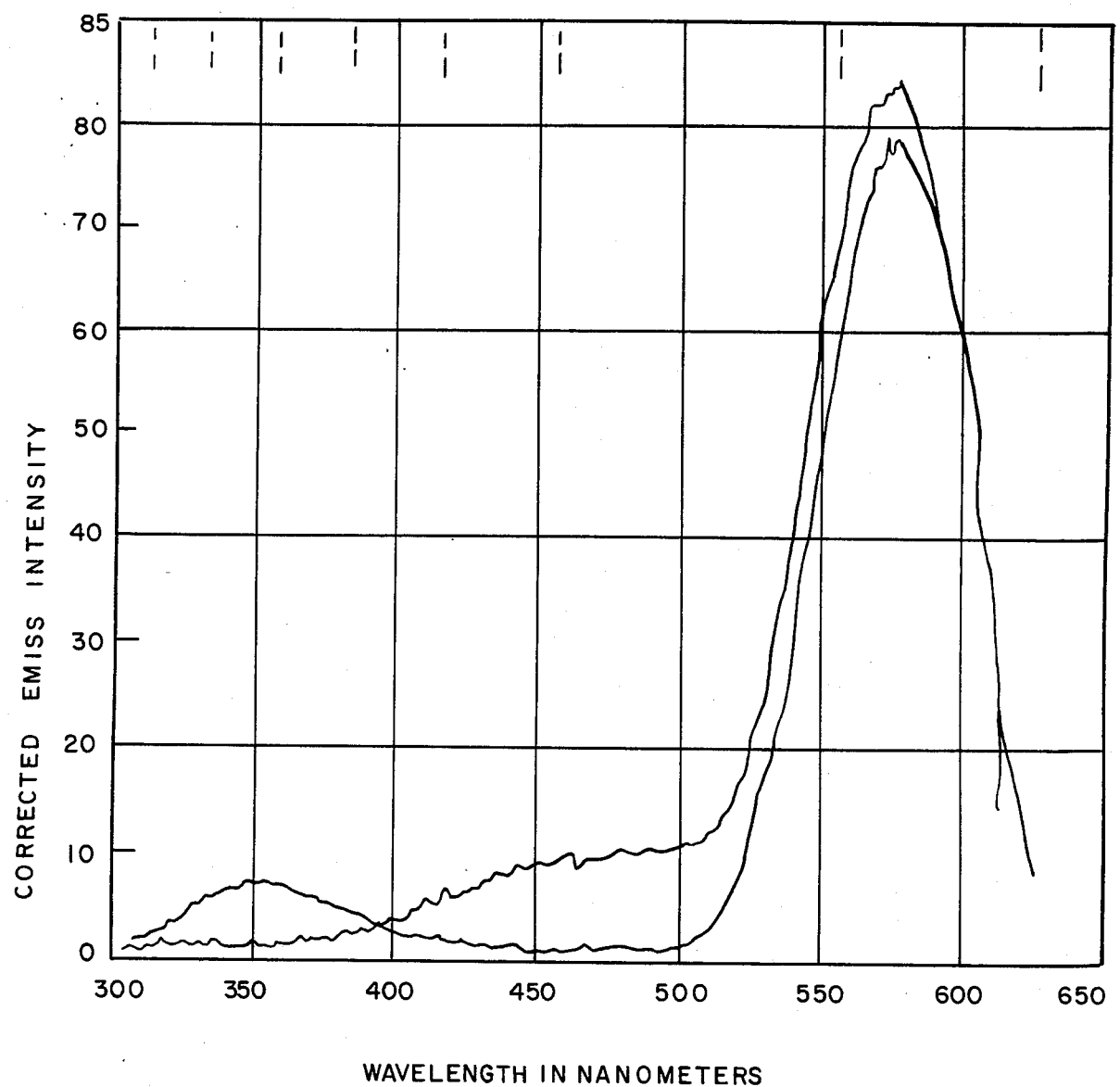
FIG. 1 is a corrected emission spectrum for excitation at 254 nm of the phosphor of example 1 compared with the corresponding emission spectrum of a commercially available yellow emitting phosphor, Sylvania Type 4381.

The emission spectra, again for 254 nm excitation, are shown in FIG. 1 for the two aforementioned phosphors. The Mn emission is remarkably similar in the two materials, both in spectral position and in bandwidth. The residual $Sn^{2+}$ emission in the Ca-$\beta$-pyro:Sn:Mn of the present invention is located predominantly in the long-UV region, with peak at 350 nm. As a result the materials of the present invention have visually a yellow emission, and not the whitish emission exhibited by the reference material.

A slightly lower emission intensity (FIG. 2) was measured in the case of a material from the same firing (Example 2) but with a higher nominal formulation of Sn, namely $$Ca_{1.726}Sr_{0.05}Sn_{0.018}Mn_{0.14}P_2O_7$$

The presence of a small amount of Sr (about 2.5 at%) was found to give somewhat higher emission efficiencies than for materials exclusively containing calcium as the alkaline-earth cation component.

In preparing the $\beta$, or low-temperature phase of calcium pyrophosphate, the reaction temperature, at least for the case of the formulations covered in the present disclosure, should not exceed 1250° C., thereby minimizing the formation of the high-temperature, or alpha phase. In the latter phase the Mn emission is shifted to longer wavelengths, with peak at 595 nm, and is visually orange-red in color. The temperature of the phase transition depends in a complex fashion on the firing atmosphere, on the phosphor formulation, on the sensitizer and activator content, and on the presence of cation substituents, such as Sr.

The present inventors have discovered that Ca-$\beta$-pyro, or its Sr-modified analog, is very suitable for the production of triboluminescene or mechanoluminescence, i.e., for the conversion of mechanical energy into light. The mechanoluminescent effect was observed for a varity of activators/sensitizers ($Sn^{2+}$; $Mn^{2+}$; $Eu^{2+}$-$Mn^{2+}$; $Sb^{3+}$-$Mn^{2+}$; $Ce^{3+}$-$Mn^{2+}$).

The triboluminescent effect was particularly intense in the case of Sn-Mn coactivation of Ca-$\beta$-pyro, and was generally favored by the high emission efficiency of the material for UV excitation, and by the increased hardness of the phosphor cake. Yellow emission was easily observed in the case of the phosphors from Examples 1 and 2 on scraping the phosphor cake with a razor blade, and tapping the cake with a glass rod or a metal rod. A wider emission area was observed on breaking the phosphor cake, most of the fracture area being involved in the emission process. Triboluminescence was also observed on mortaring the material.

All of the chemical raw materials employed in phosphor preparation were of Luminescent or Reagent grade purity. A powder blend was created by milling together the desired quantities of these raw materials. The composition of the various powder blends, together with the processing steps required for phosphor preparation are given below.

EXAMPLE 1

| Ingredient | Mole Ratio | Weight (grams) |
|---|---|---|
| CaHPO$_4$ | 1.738 | 18.92 |
| SrHPO$_4$ | 0.05 | 0.73 |
| Sn$_2$P$_2$O$_7$ | 0.006 | 0.20 |
| MnCO$_3$ | 0.14 | 1.39 |
| (NH$_4$)$_2$HPO$_4$ | 0.2 | 2.11 |

After a thoroughly mixed powder blend had been achieved it was heated in an uncovered alumina tray to a temperature of 625° C. in a gas stream consisting of 99.5% nitrogen/0.5% hydrogen (by volume). The powder was held at temperature in this mildly reducing atmosphere for a period of 30 minutes, after which the hydrogen component of the gas flow was eliminated and the furnace temperature was increased to 1200° C. This temperature was maintained for a one hour and the furnace was then turned off and the sample allowed to cool to 600° C. The tray was then transferred to the vestibule area of the furnace where it continued to cool under a nitrogen atmosphere to ambient, i.e., room temperature. The resulting white-bodied phosphor of nominal formula $$Ca_{1.738}Sr_{0.05}Sn_{0.012}Mn_{0.14}P_2O_7$$

had a plaque brightness measured at 93% of that of the Ca fluoroapatite:Sb:Mn referenece material.

EXAMPLE 2

| Ingredient | Mole Ratio | Weight (grams) |
|---|---|---|
| CaHPO$_4$ | 1.732 | 18.85 |
| SrHPO$_4$ | 0.05 | 0.73 |
| Sn$_2$P$_2$O$_7$ | 0.009 | 0.30 |
| MnCO$_3$ | 0.14 | 1.39 |
| (NH$_4$)$_2$HPO$_4$ | 0.2 | 2.11 |

The powder blend was precessed as in Example 1 above. The resulting white bodied phosphor of nominal formula $$Ca_{1.732}Sr_{0.05}Sn_{0.018}Mn_{0.14}P_2O_7$$

exhibited a yellow emission when excited by 254 nm radiation, with a relative peak height of 93% at 575 nm.

EXAMPLE 3

| Ingredient | Mole Ratio | Weight (grams) |
|---|---|---|
| CaHPO$_4$ | 1.726 | 18.79 |
| SrHPO$_4$ | 0.05 | 0.73 |
| Sn$_2$P$_2$O$_7$ | 0.012 | 0.40 |
| MnCO$_3$ | 0.14 | 1.39 |
| (NH$_4$)$_2$HPO$_4$ | 0.2 | 2.11 |

The powder blend was processed as in Example 1 above. The resulting white bodied phosphor of nominal formula $$Ca_{1.726}Sr_{0.05}Sn_{0.02}Mn_{0.14}P_2O_7$$

exhibited a yellow emission when excited by 254 nm radiation. Relative intensity of the emission at 575 nm was 89%.

EXAMPLE 4

| Ingredient | Mole Ratio | Weight (grams) |
|---|---|---|
| CaHPO$_4$ | 1.708 | 18.59 |
| SrHPO$_4$ | 0.08 | 1.18 |
| SnHPO$_4$ | 0.012 | 0.21 |
| MnCO$_3$ | 0.14 | 1.39 |
| (NH$_4$)$_2$HPO$_4$ | 0.2 | 2.11 |

The powder blend was processed as in Example 1 above. The resulting white-bodied phosphor of nominal formula $$Ca_{1.708}Sr_{0.08}Sn_{0.012}Mn_{0.14}P_2O_7$$

exhibited a yellow emission when excited by 254 nm radiation. Relative intensity of the emission at 575 nm was 86.5%.

EXAMPLE 5

| Ingredient | Mole Ratio | Weight (grams) |
|---|---|---|
| CaHPO$_4$ | 1.738 | 18.92 |
| CaCO$_3$ | 0.02 | 0.16 |
| SrHPO$_4$ | 0.05 | 0.73 |
| SnHPO$_4$ | 0.012 | 0.21 |
| MnCO$_3$ | 0.12 | 1.19 |
| (NH$_4$)$_2$HPO$_4$ | 0.2 | 2.11 |

The powder blend was processed as in Example 1 above. The resulting white-bodied phosphor of nominal formula $$Ca_{1.758}Sr_{0.05}Sn_{0.012}Mn_{0.12}P_2O_7$$

exhibited a yellow emission when excited by 254 nm radiation. Relative intensity of the emission at 575 nm was 89%.

EXAMPLE 6

| Ingredient | Mole Ratio | Weight (grams) |
|---|---|---|
| CaHPO$_4$ | 1.718 | 18.70 |
| CdO | 0.02 | 0.21 |
| SrHPO$_4$ | 0.05 | 0.73 |
| Sn$_2$P$_2$O$_7$ | 0.006 | 0.20 |
| MnCO$_3$ | 0.14 | 1.39 |
| (NH$_4$)$_2$HPO$_4$ | 0.22 | 2.32 |

The powder blend was processed as in Example 1 above. The resulting white-bodied phosphor of nominal formula $$Ca_{1.758}Sr_{0.05}Cd_{0.02}Sn_{0.012}Mn_{0.14}P_2O_7$$

has a yellow emission when excited by 254 nm radiation. Relative intensity of the emission at 575 nm was 85%.

Figure 2:
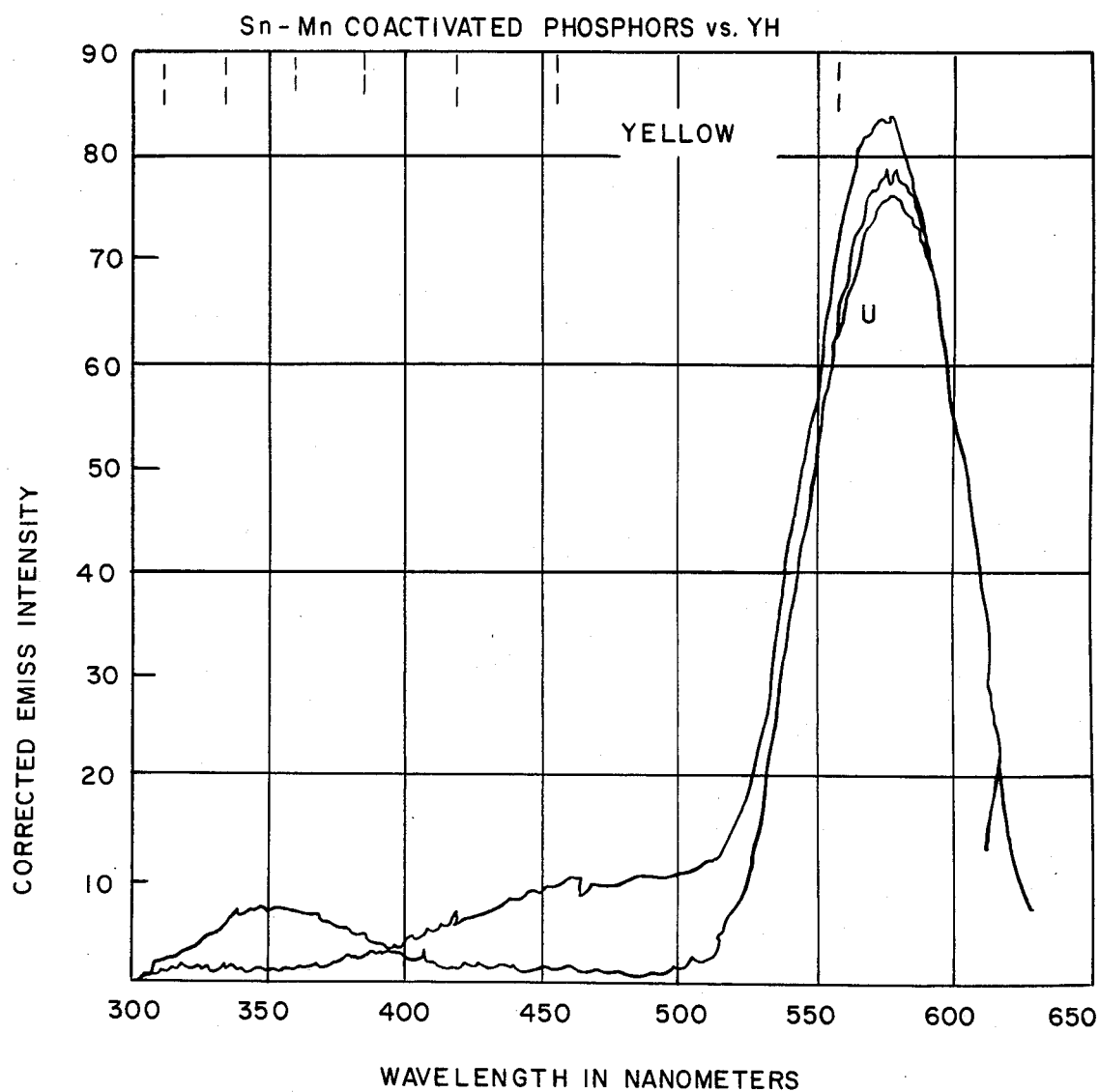
FIG. 2 is a corrected emission spectrum for excitation at 254 nm of the phosphor of example 2.
Figure 3:
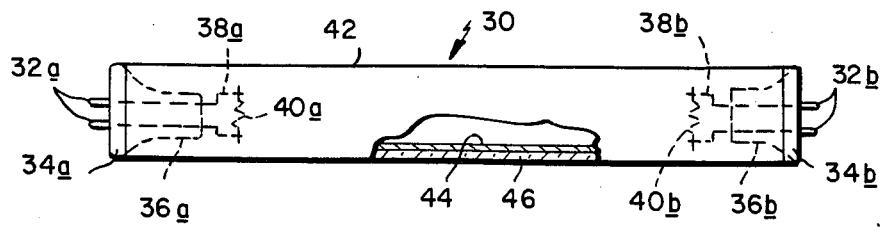
FIG. 3 is a lateral view, partially cut-away, of a fluorescent lamp utilizing a phosphor of the present invention.

A second aspect of the present invention is illustrated in FIG. 2. A fluorescent lamp 30 comprises a transparent, light-transmitting sealed envelope 42, prepared preferably, from glass. The envelope 42 is fitted at each end with mounts comprising electrodes 40a and 40b, re-entrant stem presses 36a and 36b, and lead-in conductors 38a and 38b. Base caps 34a and 34b and pins 32a and 32b are provided at each end of the envelope, together with a small charge of mercury 44 within the envelope 42. The inner surface of envelope 42 is coated with a phosphor layer of the present invention 46.

The present invention has been described in detail, including the preferred embodiments thereof. However, it will be appreciated that those skilled in the art, upon consideration of the present disclosure, may make modifications and improvements on this invention and still be within the scope and spirit of this invention as set forth in the following claims.

What is claimed is:

1. A process for preparing the efficient, high-brightness, yellow emitting phosphors comprising tin, manganese co-activated calcium pyrophosphate beta-phase matrices having the general formula:

$$Ca_{(2-v-w-x-y-z)}(NSF)_v Sr_w Cd_x Sn_y Mn_z P_2 O_7$$

wherein:
NSF is the non-stoichiometric factor;
$0 \leq v \leq 0.1$
$0 \leq w \leq 0.08$;
$0 \leq x \leq 0.05$;
$0.01 \leq y \leq 0.03$; and
$0.05 \leq z \leq 0.15$;
said phosphors characterized by yellow emission peaking at about 575 nm when excited by radiation of 254 nm and said phosphors exhibiting triboluminescence and mechanoluminescence said process comprising:
 (a) forming an admixture of powdered reagents, selected from the carbonates, fluorides, oxides and phosphates of calcium, strontium, cadmium, tin, and manganese, followed by:
 (b) heating the admixture in a midly reducing atmosphere of about 99.5% (vol) nitrogen—about 0.5% (vol) hydrogen, to a temperature of about 625° C., holding said mixture at 625° C. for about 0.5 hours in said midly reducing atmosphere; then
 (c) eliminating the hydrogen component in said step (b) atmosphere and firing the admixture by increasing the temperature to 1200° C. for a period of about 1 hour; and
 (d) allowing said mixture to cool in said step (c) atmosphere.

* * * * *